United States Patent [19]

Kunze

[11] Patent Number: 4,500,166

[45] Date of Patent: Feb. 19, 1985

[54] SPLICE CARRIER FOR LIGHT WAVEGUIDE CABLES

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 398,640

[22] Filed: Jul. 15, 1982

[30] Foreign Application Priority Data

Aug. 25, 1981 [DE] Fed. Rep. of Germany ....... 3133586

[51] Int. Cl.³ .................................................. G02B 7/26
[52] U.S. Cl. .................................................. 350/96.20
[58] Field of Search ............... 350/96.15, 96.20, 96.21, 350/96.22

[56] References Cited

U.S. PATENT DOCUMENTS

| | | | |
|---|---|---|---|
| 4,171,867 | 10/1979 | Cocito | 350/96.21 |
| 4,266,853 | 5/1981 | Hutchins et al. | 350/96.20 |
| 4,319,951 | 3/1982 | Korbelak et al. | 350/96.21 X |
| 4,332,435 | 6/1982 | Post | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |

FOREIGN PATENT DOCUMENTS

| | | | |
|---|---|---|---|
| 2914217 | 10/1980 | Fed. Rep. of Germany | 350/96.20 |
| 3025700 | 1/1982 | Fed. Rep. of Germany | |
| 56-12607 | 2/1981 | Japan | 350/96.21 |

Primary Examiner—John Lee
Attorney, Agent, or Firm—Hill, Van Santen, Steadman & Simpson

[57] ABSTRACT

A cable sleeve which has a plurality of splice carriers with an arrangement for storing the splices between individual waveguides and for storing excess length of each of the waveguides being spliced together characterized by each of the carrier plates having openings for the incoming and outgoing bundles which are adjacent to each other so that the carrier can be pivoted around a point or an axis adjacent the openings to enable easy access for making the splices and/or repairing the waveguides.

17 Claims, 6 Drawing Figures

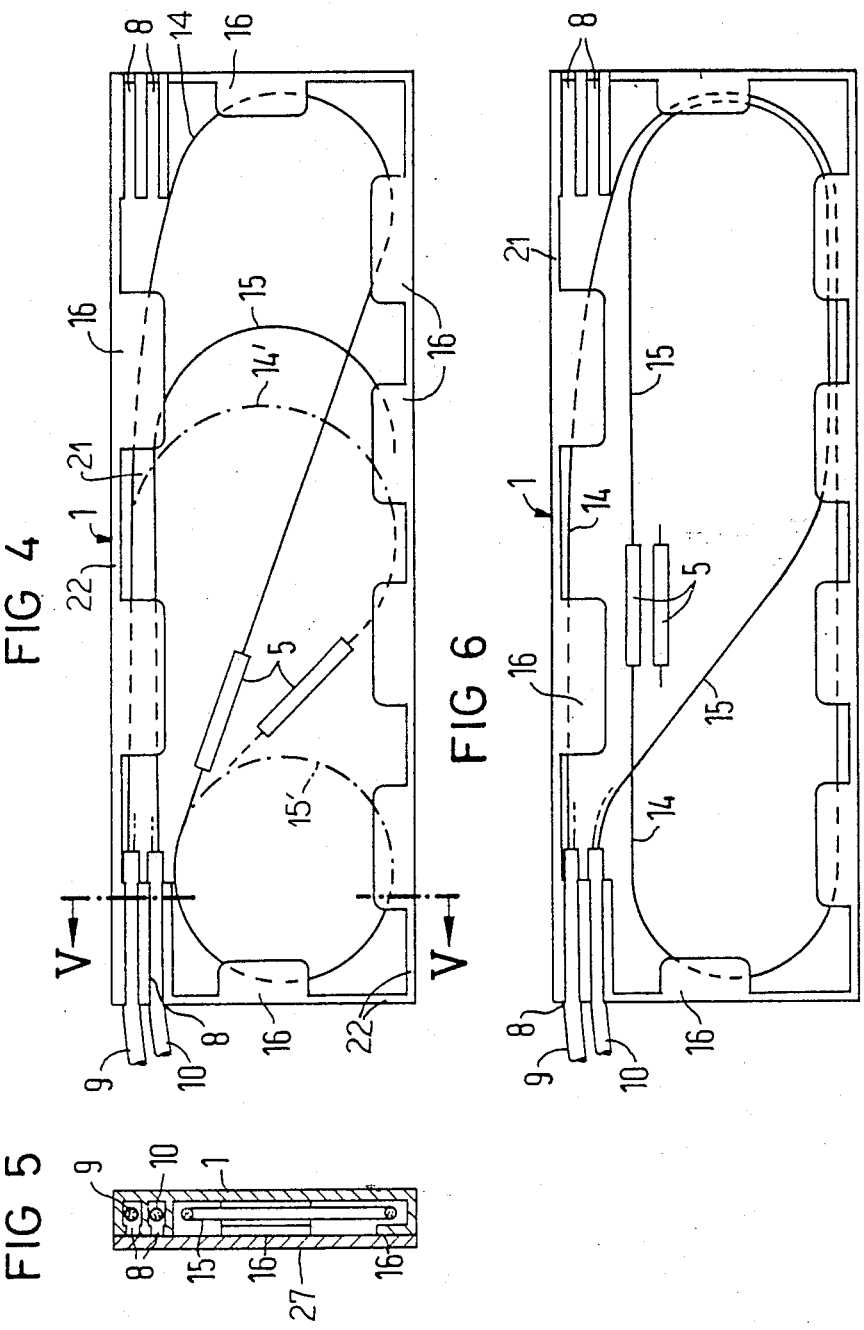

SPLICE CARRIER FOR LIGHT WAVEGUIDE CABLES

BACKGROUND OF THE INVENTION

The present invention is directed to a splice carrier for light waveguide cables whereby a plurality of splice carriers can be inserted into a cable sleeve to form a splice connection wherein each of the individual carriers contains a device for supporting the splices between individual light waveguides and devices for supporting excess lengths of each of the waveguides being spliced together.

A light waveguide carrier, which is positioned in a cable sleeve and supports the excess lengths of light waveguides and the splice between the two waveguides is disclosed in copending U.S. patent application Ser. No. 269,871, filed June 3, 1981, which application was based on German patent application P No. 30 25 700. In the disclosed arrangement, the cable sleeve for the light waveguide cables, which are to have the waveguides spliced together, also receive an excess length of each of the waveguides on plug-in plates or carrier plates for the individual groups or bundles of light waveguides, which carrier plates are spaced out to extend basically parallel to each other in the cable sleeve. Each of these individual carrier plates contains means for supporting the splices between the waveguides and also the excess length of the waveguide. With such an arrangement, the accessibility of the individual splices to light waveguides supported on each plate is essentially only achieved when, after removing the housing of the cable sleeve, each of the cable connections is folded open.

Another possibility of increasing accessibility would be achieved if the light waveguide cables or bundles which are conducted to each of the plug-in plates or carrier plates were already introduced with an excess length outside of the carrier plate and this excess length is stored in the housing of the cable sleeve. This type of arrangement is generally indicated by a cable sleeve or system indicated at 25 and schematically illustrated in FIG. 1. In the system 25, an incoming cable 2 has bundles 10 and an outgoing cable 3 has bundles 9. The bundles 9 and 10 are connected to opposite ends of a carrier plate 1 so that the individual waveguides 4 can be spliced together by a splice or connection 5. As illustrated in the Figure, the individual bundles 9 and 10 of waveguides are fanned or opened up around an axis 6 for the incoming and outgoing cables 2 and 3. Due to the excess length of the bundles such as 9 and 10, the carrer 1 can be moved in the direction of arrow 7 to a position shown by carrier 1' with the bundles 9 and 10 being moved to the position of the bundles 9' and 10' illustrated in dashed lines. As is clear from this illustration, the bundles of the light waveguides which are provided in the cable sleeve adjacent to each of the splice carriers will require significant space in the cable sleeve for the excess length of each of the bundles 9 and 10, which length is necessary to enable removal of each of the splice carriers. Given such an arrangement, the bundles of the light waveguides must be supplied to each of the splice carriers proceeding from both sides so that the excess length required for movement is available to enable moving the splice carrier from the inserted position in the cable sleeve to the extended position without danger of buckling of the waveguides.

SUMMARY OF THE INVENTION

The present invention is directed to providing a splice carrier for storing splices between waveguides and excess lengths of the waveguide and is insertable into a cable sleeve. The splice carrier makes it possible to create a space-saving and serviceable arrangement with good accessibility of each individual splice carrier of the cable sleeve without requiring excessive lengths of the bundles of the light waveguides outside of each splice carrier.

To obtain these objects, the present invention is directed to an improvement in a splice carrier for bundles of a light waveguide cable, said splice carrier being inserted into a cable sleeve with a plurality of similar splice carriers to form a splice connection, each individual splice carrier containing means for mounting the splices of the waveguides and means for storing an excess length of each of the waveguides of each waveguide bundle. The improvement comprises that each of the splice carriers has an opening means with an axis for introducing the incoming and outgoing bundles of light waveguides to the carrier, said opening means being disposed on the same side of the splice carrier and adjacent each other in such a manner that the individual splice carriers of the splice connection of the sleeve can be pivoted around an imaginary point lying approximately on the axis of the opening means from a storage position to an extended position.

As a result of this inventive splice carrier, a particular space-saving splice system for light waveguide cables becomes possible in which the greatest possible plurality of waveguide connections can be accommodated in a small space. It is thereby guaranteed that each individual splice location is successful even after completion of the splice. As already initially described, a certain excess length has to be provided outside of the splice carrier for each bundle of light waveguides by means of which excess length it is possible to remove the splice carrier from the overall or normal arrangement in the cable sleeve to an extended position which enables positioning the carrier adjacent a splicing device. For this purpose, however, the two-sided bundle introduction into the splice carrier was required. Given the splicing system with the inventive splice carrier, the bundle introductions only occur at one side of the splice carrier. It is possible to stack the individual splice carriers in a circle-like structure whereby a tubular hollow space is produced in the center of the stacks. The bundles of the light waveguides can now be introduced within this hollow space in a space-saving manner and can then be conducted toward the outside to the opening means which are positioned at the side of each of the splice carriers to receive both the incoming and outgoing bundles. In comparison to the earlier arrangements, because of the shortening of the overall length of each of the bundles, a saving of space is achieved or, respectively, the saved space can be utilized for additional splice carriers. It is further advantageous that the splice carriers can be pivoted out of the cable sleeve at the side of the cable introduction so that the accessibility of individual splice locations on each splice carrier is provided. The pivot point for the splice carrier is thereby approximately in the area of the access of each of the bundles of waveguides so that no excess lengths of the bundles of the light waveguide outside of the splice carrier are required for the purpose enabling this pivoting movement.

BRIEF DESCRIPTION OF THE DRAWINGS

FIG. 4 is a plan view of the splice carrier of the present invention without a cover plate;

FIG. 5 is a cross-sectional view of the splice carrier of FIG. 4 taken along the lines V—V and with a cover plate; and FIG. 6 is a plan view of a splice carrier with a different arrangement of the waveguides.

DESCRIPTION OF THE PREFERRED EMBODIMENTS

Figure 1:
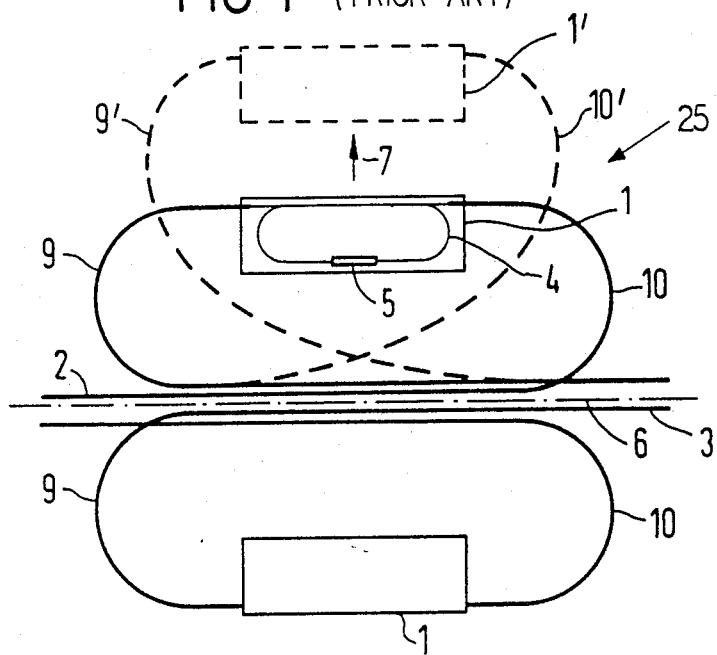
FIG. 1 is a schematic illustration of a known splicing system of the traditional type.
Figure 2:
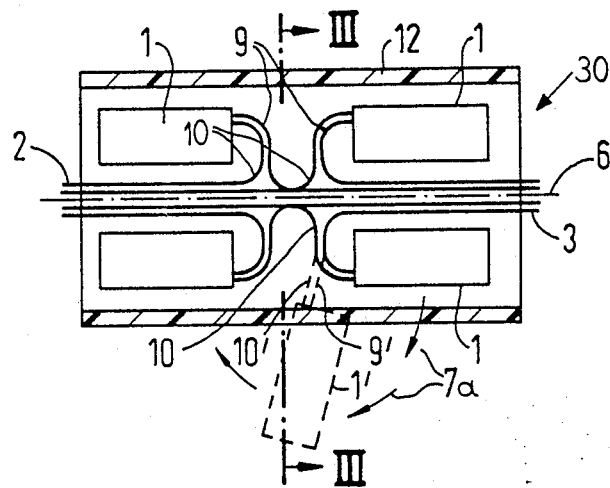
FIG. 2 is a longitudinal cross-sectional view with portions removed for purposes of illustration of the splicing system according to the present invention.
Figure 3:
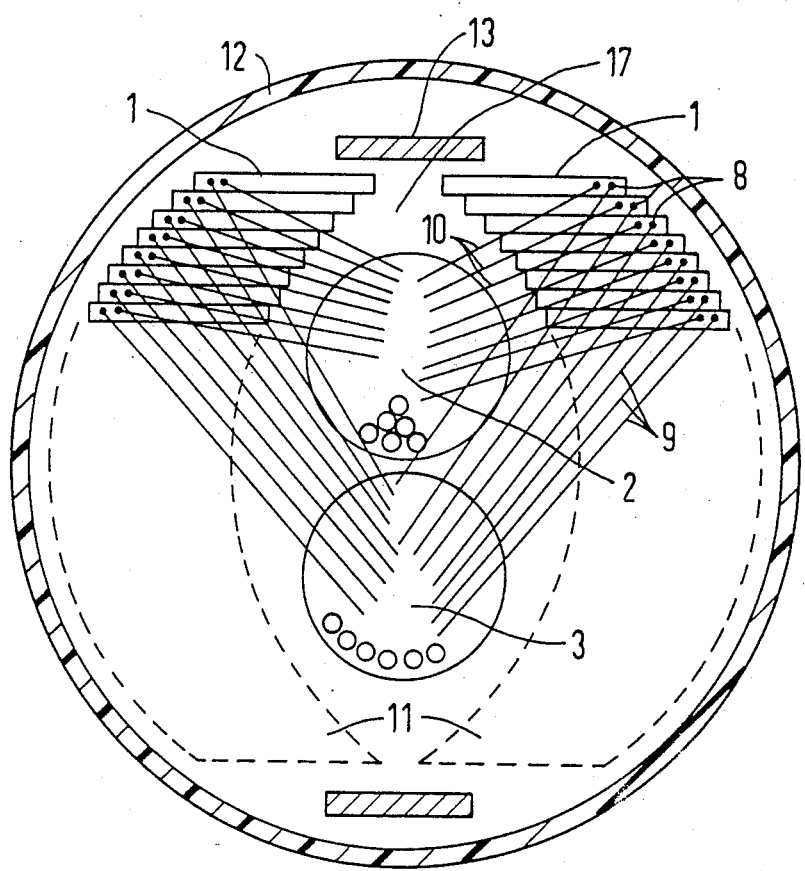
FIG. 3 is a cross-sectional view taken on the lines III—III of FIG. 2.

The principles of the present invention are particularly useful in a splicing system generally indicated at 30 in FIGS. 2 and 3. In the arrangement of the device 30, an incoming cable 2 has a plurality of bundles 10 of light waveguides and an outgoing cable 3 has a plurality of bundles 9 of light waveguides. The splice carrier or plate 1 receives a bundle 9 and a bundle 10 with the bundles 9 and 10 entering the splice carrier 1 closely adjacent each other. The excess length of each of these bundles 9 and 10 is disposed in a ray-like or radially extending manner around a common axis 6 or as best illustrated in FIG. 3, the bundles 9 and 10 extend radially outward from adjacent areas which are near the center of a sleeve 12. The cable guidance occurs in the inside cavity of the splicing system 30 so that the feed of the bundles to the individual splice carriers occurs in a ray-shape toward the outside in the center of the sleeve 12. By so doing, it is possible that the individual splice carriers, for example, 1' (FIG. 2), can be pivoted out of the overall connection around an imaginary axis or point which is in the approximate area of the bundles 9 and 10 for the particular splice carrier and thus the arrangement enables a simple manipulation of the carrier with a good and safe exploitation of this feature.

As best illustrated in FIG. 3, individual splice carriers are arranged in stacks 11 in the cable sleeve 12. To hold the cable sleeves in the stacks 11, support means are provided which are not illustrated but will keep the stacks 11 in an approximate curve configuration which is similar to the curvature of the sleeve 12. Thus, the support means maintain the stack with a hollow area 17 in the center of the sleeve 12 which is aligned with the incoming cable 2 and the outgoing cable 3. The support means for holding the stack 11 can be attached to connecting rails such as 13 so that the structure is mechanically stable. Since each of the bundles 9 and 10 from the cables 2 and 3 extend radially outward from the cable to their respective carrier 1 which have opening means 8 for receiving the bundles 9 and 10, a small amount of slack in the bundles 9 and 10 will allow pivoting-out of the splice carrier 1 to gain access thereto with the pivoting being around a point adjacent the opening means 8.

The structure of the splice carrier 1 is best illustrated in FIGS. 4 and 5. The splice carrier 1 includes a member or base plate 21 which has a rectangular configuration and is provided with a peripheral edge 22. The member has a pair of parallel extending channels 8 at one corner for receiving the bundles 9 and 10. As illustrated, a second pair of channels 8 is provided on an opposite corner. The peripheral edge 22 of the plate has flanges or guides 16 which act as means for receiving and storing the individual waveguides such as the waveguide 14 of the bundle 9 and the waveguide 15 of the bundle 10. Also, due to the edges 22 of the member 21, space is provided for receiving the splices such as 5. The light waveguides 14 and 15 have an excess length which is received in the cavity formed by the edges 22. In the embodiment illustrated in FIGS. 4 and 5, the waveguides 14 and 15 loop in the same direction with the waveguide 15 having a second loop so that they can be spliced together by a splice 5. It should be noted that the excess length of each of the waveguides 14 and 15 is selected so that they occupy the greatest possible space in an arcuate form. This space is dimensioned in such a manner that the waveguides are bent on a radius which is greater than the minimum acceptable radius for beinding of the waveguides. The particular dimension, such as the bending radius of the waveguides will determine the height of the splice carrier 1 whereas the original excess length required later for cutting out and resplicing a connection of the light waveguides will determine the longitudinal length of the carrier 1.

In FIG. 4, the individual waveguide ends 14 and 15 are first illustrated in bold lines in the original excess length. A dot-dash line shows how the two waveguides can be stored after a portion of the excess length has been utilized during either subsequent repair work or resplicing of the two waveguides together. It should be noted that in the arrangement illustrated in lines 15', that the bending radius of each of the fibers is still greater than the minimum radius. The splices which are formed by splice connectors 5 are disposed diagonally of the light waveguide loops since the laying of the individual light waveguides in the incoming and outgoing waveguide bundles 9 and 10 are disposed as a loop proceeding in the same direction.

As indicated in FIG. 5, a cover plate 27 can be used to enclose the waveguides in the carrier 1. Also, the structure of the opening means formed by the channel such as 8 is shown in FIG. 5. Each of the channels 8 is of a structure to receive the bundle such as 9 or 10 and hold the bundle as the various light waveguides extend therefrom into the cavity of the member 21 forming the carrier.

A different arrangement of the waveguides in the carrier is illustrated in FIG. 6. In this arrangement, the body of the carrer 1 is composed of the same structural features as the carrier 1 of FIG 4. However, the excess length of the individual waveguides are laid in opposite directions by means of which a particular serviceable arrangement can be achieved for the splice connectors 5. The light waveguides 14 and 15 are again laid in arcuate form and are held in this position with the guide angles or flanges 16. In this arrangement as in FIG. 4, the opening means are formed of parallel channels 8 which are disposed at one of the corners as well as in an opposite corner so that a common introduction of the bundles can occur at either one or the other ends of the carrier. By so doing, the arrangement illustrated in FIG. 2 wherein the bundles all enter carriers substantially from the center of the cable sleeve can be obtained.

Although various minor modifications may be suggested by those versed in the art, it should be understood that I wish to embody within the scope of the patent granted hereon, all such modifications as reasonably and properly come within the scope of my contribution to the art.

I claim:

1. In a splice carrier for light waveguide cables having bundles of light waveguides, said splice carrier being inserted into a cable sleeve with a plurality of similar splice carriers to form a splice connection between waveguides of two bundles from two cables entering opposite ends of the cable sleeve, each individual splice carrier being a rectangular member and containing both means for mounting the splices of the waveguides and means for storing excess length of the waveguides of each bundle of waveguides associated with the carrier, the improvement comprising each of the splice carriers having two opening means with an axis for introducing the incoming and outgoing bundles of light waveguides to the carrier, said opening means being disposed on the same side of the splice carrier adjacent a corner of the rectangular member and adjacent each other in such a manner that an individual splice carrier can be pivoted around an imaginary point lying adjacent the corner and approximately on the axis of the two opening means.

2. In a splice carrier according to claim 1, wherein the means for storing the excess length of each of the light waveguides of the two bundles stores the waveguides with loops for the incoming and outgoing waveguides running in the same direction.

3. In a splice carrier according to claim 1, wherein the means for storing the excess length of each of the light waveguides of the two bundles stores the waveguides with loops of the incoming and outgoing waveguides running in opposite directions.

4. In a splice carrier according to claim 1, wherein each of the splice carriers includes a flat component for receiving the bundles of light waveguides and the splices between the waveguides of the two bundles and a cover for enclosing said waveguides and splices.

5. In a splice carrier according to claim 1, which includes two additional opening means arranged as a pair adjacent another corner of the carrier.

6. In a splice carrier according to claim 5, wherein each splice carrier is composed of a flat component for receiving the bundles of waveguides and the splices between the individual light waveguides and includes a cover for enclosing the splices and waveguides therein.

7. In a splice carrier according to claim 1, wherein the two opening means comprise a pair of parallel extending channels.

8. In a splice carrier according to claim 7, wherein the rectangular member contains the splices between the waveguides of the bundles and the carrier includes a cover for enclosing the splices and waveguides therein.

9. In a splice carrier according to claim 7, which includes another two parallel extending channels adjacent another corner of the rectangular member.

10. In a cable sleeve for light waveguide cables having bundles of light waveguides, said sleeve having a housing with a pair of cable entrances for receiving light waveguide cables whose waveguide cores are spliced together in the housing, said housing having means for positioning a plurality of splice carriers for the light waveguides of each cable, each of the splice carriers containing means for mounting the splices of the waveguides between two bundles of waveguides and means for storing excess lengths of the waveguides of each bundle, the improvement comprising each of the splice carriers being a rectangular member and having two opening means with an axis for introducing two bundles of light waveguides to the carrier, said two opening means being disposed on the same one side of the carrier adjacent a corner of the member and adjacent each other in such a manner that an individual splice carrier can be pivoted around an imaginary point lying adjacent the corner and approximately on the axis of the two opening means from a storage position in said sleeve to an extended position to enable access to the splices and waveguides supported thereon.

11. In a cable sleeve according to claim 10, wherein each of the splice carriers is positioned with the corner being adjacent an outer wall of the sleeve.

12. In a cable sleeve according to claim 10, wherein the cable sleeve is substantially cylindrical and the splice carriers are arranged in a stack with each carrier being substantial on a radius of the sleeve to leave an axial portion of the sleeve free of carriers to receive the cables, and the corner of each carrier being positioned adjacent an outermost wall of the cable sleeve.

13. In a cable sleeve according to claim 10, wherein the means for storing the excess length of each of the light waveguides of the two bundles of each splice carrier stores the waveguides with loops for the waveguides of the two bundles running in the same direction.

14. In a cable sleeve according to claim 10, wherein the means for storing the excess length of each of the light waveguides of the two bundles of each splice carrier stores the waveguides with loops of the waveguides of the two bundles running in opposite directions.

15. In a cable sleeve according to claim 10, wherein each of the splice carriers includes a flat component for receiving the bundles of light waveguides and the splices between the waveguides of the two bundles and a cover for enclosing said waveguides and splices.

16. In a cable sleeve according to claim 15, wherein the rectangular member of the splice carrier contains the splices between the waveguides of the bundles and the carrier includes a cover for enclosing the splices and waveguides therein.

17. In a cable sleeve according to claim 10, wherein the two opening means of each carrier comprise a pair of channels extending parallel to each other and a side of the rectangular member adjacent the one side.

* * * * *